United States Patent [19]

Sanders et al.

[11] Patent Number: 4,641,056

[45] Date of Patent: Feb. 3, 1987

[54] PLASTIC-BASED AUTOMOTIVE HEADLAMP

[75] Inventors: Rudolf Sanders; Josephus F. Rijckaert, both of Eindhoven, Netherlands

[73] Assignee: U.S. Philips Corporation, New York, N.Y.

[21] Appl. No.: 693,402

[22] Filed: Jan. 22, 1985

[30] Foreign Application Priority Data

Oct. 12, 1984 [NL] Netherlands .......................... 8403115

[51] Int. Cl.[4] .......................... H01J 5/60; H01G 5/14

[52] U.S. Cl. ...................................... 313/51; 313/318; 362/296

[58] Field of Search .......................... 313/50, 623-624, 313/318; 362/346, 297, 310, 296, 341, 315; 339/144-146

[56] References Cited

U.S. PATENT DOCUMENTS 4,119,877 10/1978 Grewe et al. ........................ 313/318

4,412,273 10/1983 Helbig et al. ........................ 362/296

FOREIGN PATENT DOCUMENTS 339927 12/1930 United Kingdom ................ 313/318

*Primary Examiner*—Palmer C. DeMeo

*Assistant Examiner*—Sandra L. O'Shea

*Attorney, Agent, or Firm*—David R. Treacy

[57] ABSTRACT

An electrical lamp having a cap of synthetic material. A lamp vessel with a pinch seal is fixedly secured in a metal plate which is welded to a metal sleeve. The sleeve is rigidly secured in a two-part cup-shaped lamp cap which has a mounting flange and a groove for a sealing ring. The lamp cap is formed of first and second bodies of synthetic material which are rigidly connected to each other, the metal sleeve being locked to the first body, and the groove walls being formed by respective parts of each of the bodies.

10 Claims, 2 Drawing Figures

PLASTIC-BASED AUTOMOTIVE HEADLAMP

BACKGROUND OF THE INVENTION

The invention relates to an electrical lamp provided with a cap comprising:

a gas-filled translucent lamp vessel scaled in a vacuum-tight manner and having a pinch seal;

an electrical element arranged within the lamp vessel;

current conductors passing through the wall of the lamp vessel to the electrical element;

a metal clamping plate having an opening in which the pinch seal is held fast by lugs formed in the clamping plate, which clamping plate has a substantially circular-cylindrically flanged edge or collar;

a substantially circular-cylindrical metal sleeve having first and second ends which is joined telescopically at its first end to the collar of the clamping plate and is rigidly secured thereto;

a cup-shaped lamp cap of synthetic material in which the second end of the metal sleeve is fixed and which has a bottom portion and a substantially cylindrical wall portion and is provided at its outer surface with a projecting flange and, at the side thereof facing the lamp vessel, with a circumferential groove for receiving a sealing ring, electrical contacts connected to the current conductors being secured to the bottom portion.

Such an electrical lamp is known from U.S. Pat. No. 4,412,273 (Patent Treuhand Gesellschaft für Elektrische Glühlampen mbH).

The known lamp is suitable to be used as a headlight for vehicles, the lamp vessel projecting through the opening of a reflector provided with a front glass. The projecting flange of the lamp cap of synthetic material then abuts against the edge of the opening in the reflector. A ring of, for example, silicon rubber received in the circumferential groove in the outer surface of the lamp cap then seals the interior of the lantern constituted by the reflector and the front glass from the environment.

A disadvantage of the known lamp is that the lamp cap of synthetic material is of a rather complicated form, as a result of which multipartite molds are required to form the body. Another disadvantage is that it is difficult to fix the metal sleeve in the lamp cap. The aforementioned U.S. Patent is silent as to the manner in which the metal sleeve is fixed in the lamp cap. Nevertheless the usability of the lamp depends completely upon whether a rigid connection of the sleeve to the lamp cap is or is not available. In fact, the light-emitting electrical element or elements of the lamp should be located at a predetermined area when mounting the lamp in a reflector. For this purpose, the element(s) should occupy a predetermined position with respect to reference points on the flange of the lamp cap and should also retain this position over a prolonged period of use of the lamp. When the pinch seal is rigidly secured in the clamping plate and when the clamping plate is rigidly secured to the metal sleeve, the electrical element being aligned with respect to the flange of the lamp cap, the connection of this sleeve to the lamp cap is determinative of the quality of the lamp.

SUMMARY OF THE INVENTION

The invention has for its object to provide an electrical lamp of the kind described, which is of a simply realizable and reliable construction.

According to the invention, in a lamp of the kind described in the opening paragraph, this object is achieved in that the lamp cap comprises a first substantially circular-cylindrical hollow body of synthetic material which is provided with a circumferential ridge and a second body of synthetic material rigidly connected to each other. The second body has a disk-shaped portion having an upright edge and a projecting flange, the upright edge of the second body surrounding the first body at a first end thereof and having an end surface. The end surface and the circumferential ridge form opposed walls of a circumferential groove for a sealing ring, and in that the first, substantially cylindrical, body and the metal sleeve have cooperating means which lock the sleeve against displacement.

Due to the fact that in the lamp according to the invention an originally multipartite lamp cap is used, not only is the manufacture of this lamp cap possible in simple molds and the bottom of the lamp cap readily accessible for securing the contacts thereto, but also there is a variety of possibilities for securing the metal sleeve to the lamp cap. The lamp is therefore of a simply realizable and reliable construction.

Before the parts of synthetic material of the lamp cap are assembled, the metal sleeve can be arranged in the cylindrical body of synthetic material. This offers various possibilities of enclosing the metal sleeve in the lamp cap of synthetic material. For example, the metal sleeve may have at its second end an outwardly flanged edge or outwardly flanged vanes, enclosed between the first and second bodies of synthetic material when these bodies are assembled and connected to each other. Alternatively, it is possible that the cylindrical body of synthetic material has at its free end an inwardly flanged edge which grips around (projections on) the metal sleeve.

In a preferred embodiment, the cylindrical body of synthetic material has at its inner surface at least one longitudinal groove open at the first end of this body and the metal sleeve has a projection which is kept fixed by this groove. As a result, both translation and rotation of the metal sleeve become impossible. In a variation thereof, the projection is held in the groove with clamping fit. For this purpose, the groove may be, for example, of a shape tapering from the first end. Alternatively, or in addition, the projection itself may be resilient in the tangential direction, comprising, for example, a stamped radially projecting bent vane or tongue. A clamping fit connection between the metal sleeve and the cylindrical body of synthetic material has the advantage that a subassembly is obtained which during the assembly of the lamp cap can be manipulated as a unit.

The bodies of synthetic material of the lamp cap may be interconnected in a vapor-tight manner. This has the advantage that a sealing ring provided in the circumferential groove has to seal the passage between the cap and the reflector only, the seam between the first and second bodies of synthetic material not constituting an open communication between the interior of the reflector and its environment by-passing the sealing ring. The interconnection can be achieved by an adhesive. However, the bodies can be very rapidly and readily interconnected by ultrasonic vibrations (welding). This form of connection further has the advantage that no volatile substances are introduced into the lamp.

The synthetic material used may be, for example, polyamide or polyphenylene sulphide.

Embodiments of the lamp according to the invention are shown in the drawing.

DESCRIPTION OF THE PREFERRED EMBODIMENT

Figure 1:
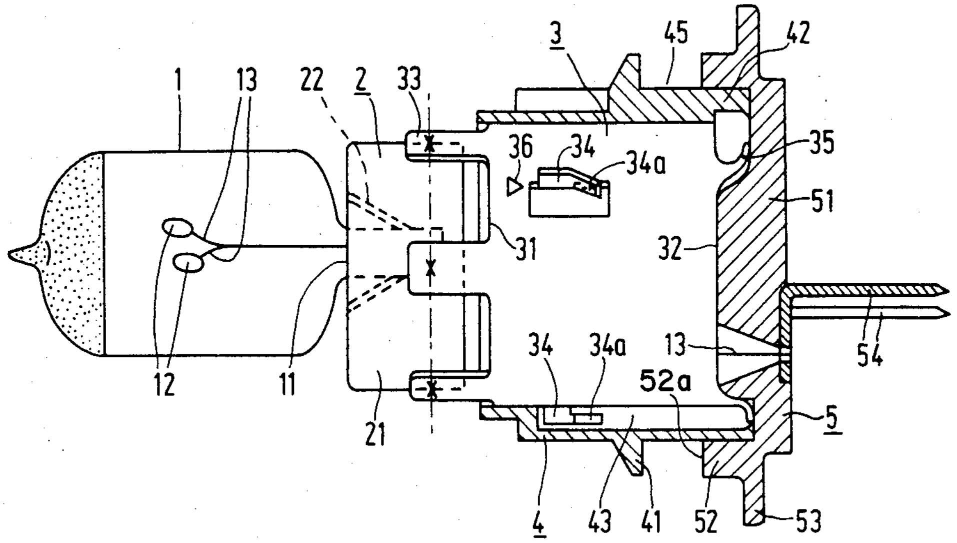
FIG. 1 shows an embodiment in side elevation with the lamp cap of synthetic material in longitudinal sectional view.

In FIG. 1, the lamp has a translucent lamp vessel 1 sealed in a vacuum-tight manner and having a pinch seal 11. As an electrical element two filaments 12 are arranged within the lamp vessel. However, the element may alternatively be a pair of electrodes or a single filament. The lamp vessel 1 is filled, for example, with a halogen-containing gas and consists of a glass capable of withstanding comparatively high temperatures, for example, more than 500° C., such as quartz glass and other glasses having a high $SiO_2$ content. Current conductors 13 pass through the wall of the lamp vessel 1 to the electrical element 12.

A metal clamping plate 2 has an opening and resilient lugs 22. The pinch 11 is passed through this opening and is immovably held by the resilient lugs 22. Such a clamping plate is known from U.S. Pat. No. 4,119,877. The clamping plate has a substantially circular-cylindrically flanged edge or collar 21, which, however, may have incisions which facilitate the process of forming it from a flat plate. The clamping plate 2 may consist, for example, of new silver, an alloy of copper, zinc and nickel.

A substantially circular-cylindrical metal sleeve 3 of, for example, chromium steel has a first end 31 and a second end 32. At its first end the sleeve has a plurality of tongues 33 distributed around its circumference. The sleeve 3 is connected at its first end 31 telescopically to the collar 21 of the clamping plate 2 and is rigidly joined to it by welds on the tongues 33. Thus, the lamp vessel 1 is rigidly secured to the sleeve 3.

The metal sleeve 3 is fixed with its second end 32 in a cup-shaped lamp cap 4, 5 of synthetic material, for example polyphenylene sulphide.

The lamp cap 4, 5 is composed of a first substantially circular-cylindrical hollow body 4 of synthetic material provided with a circumferential ridge 41, and of a second body 5 of synthetic material which has a disk-shaped part 51 with an upright edge 52 and a flange 53 projecting therefrom. The flange 53 is intended to be used as an abutment against the edge of an opening in a reflector.

To the side of the flange 53 facing the lamp vessel 1, the upright edge 52 has an end wall 52*a*. The wall 52*a* and the circumferential ridge 41 together define a circumferential groove 45 intended to receive a sealing ring, which seals the interior of the reflector from its environment when the lamp of FIG. 1 is inserted in the reflector in a manner such that the sealing ring engages the wall of the opening in the reflector.

At a first end 42, the first body 4 of synthetic material is surrounded by the upright edge 52. The first and the second body 4 and 5, respectively, of synthetic material are connected to each other in a vapor-tight manner by ultrasonic welding. Thus, it is avoided that, when the lamp is situated in a reflector, there is any open communication between the interior of the reflector and its environment by-passing a sealing ring in the groove 45.

Contacts 54 are anchored in the second body 5 of synthetic material, i.e. the bottom portion of the lamp cap 4, 5. The part of each of these contacts 54 embedded in the body 5 has a twisted shape, not visible in FIG. 1, as a result of which it is anchored. The current conductors 13 are connected to the contacts 54, of which the lamp has three.

The metal sleeve 3 has projections in the form of stamped projections 34, which are bent out of the sleeve 3 about a longitudinal line. The projections 34 have a tongue 34*a* which is bent about a radial line. The vanes 34 are thus partially resilient in the tangential direction.

The inner surface of the cylindrical body 4 of synthetic material is provided with grooves 43, which open at the first end 42 of this body 4. The grooves 43 taper widthwise from this end 42. The vanes 34 are each situated in a respective groove 43.

When the lamp is assembled, the metal sleeve 3 is inserted, its first end 31 directed forwards, into the first end 42 of the cylindrical body 4 of synthetic material, the vanes 34 each being located in a groove 43. Accordingly as the sleeve is displaced further, the clamping force of the vanes 34 increases as the tongues 34*a* are deflected in a direction tangential to the cylindrical body 4. The subassembly obtained can thus be manipulated as a unit. Furthermore, it is not possible for the metal sleeve 3 to rotate in the cylindrical body 4 of synthetic material.

The subassembly 3, 4 is combined with the second body 5 of synthetic material and is connected thereto. Flanged tongues 35 at the second end 32 of the metal sleeve 3 provide for a wide tolerance range for differences in longitudinal dimensions of the metal sleeve 3 and the cylindrical body 4 of synthetic material. After the two bodies 4 and 5 of synthetic material have been secured to each other, the metal sleeve 3 is rigidly fixed in the lamp cap 4, 5 of synthetic material by the cooperating means 34, 43 of the metal sleeve 3 and the cylindrical body 4 of synthetic material.

The unit comprising lamp vessel 1 and clamping plate 2 is arranged in the metal sleeve 3 of the unit 3, 4, 5, the current conductors 13 being passed to the outside through the contacts 54. A tongue 36 pressed inwardly of the sleeve 3 prevents the two units 1, 2 and 3, 4, 5 from sliding too far telescopically with respect to each other before the alignment. After a filament 12 has been energized, this filament is aligned with respect to reference points on the flange 53, the unit 1, 2 being caused to perform rotary and translatory movements as necessary. Subsequently, welds are made on the tongues 33. Thus, a rigid relation between the electrical elements 12 and the reference points on the flange 53 is obtained. The current condutors 13 are cut to length and secured to the contacts 54. It is ensured that the passage of these current conductors 13 through the contacts 54 is sealed in a vapor-tight manner, for example by means of solder or a mass of synthetic material.

The metal sleeve 3 need not have a closed sheath, but may consist of cylindrically bent sheet material and may have a longitudinal slot. Alternatively, a seam, a soldering seam, a welding seam or a flanging seam may be formed.

Figure 2:
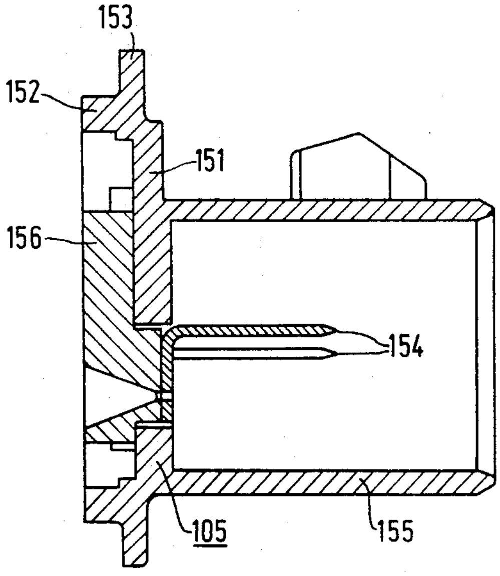
FIG. 2 shows a second embodiment of the second body of synthetic material of the lamp cap in longitudinal sectional view.

In FIG. 2, corresponding parts have each been designated with a reference numeral 100 higher than in FIG. 1.

The contacts 154 are surrounded by a sleeve 155, into which a plug with the contact terminals of a current source can be inserted. The contacts 154 are anchored in the second body 105 of synthetic material in that their part flanged along a meandering line is included between the disk-shaped part 151 and a plate 156 of synthetic material and these parts are interconnected, for example, by ultrasonic welding.

What is claimed is:

1. An electric lamp having a flanged cap mounting, comprising a translucent lamp vessel having a pinch seal, an electrical element arranged within said vessel, electrical current conductors connected to said element and passing from said vessel, a metal clamping plate having an opening in which the pinch seal is held, and a substantially circular-cylindrical collar, a substantially circular-cylindrical metal sleeve having first and second ends, joined telescopically at said first end to said collar and rigidly secured thereto, a cup-shaped lamp cap of synthetic material in which said second end is fixed; and which has a bottom portion, a substantially cylindrical wall portion, a mounting flange extending from an outer surface of said wall portion, and, to the side of the flange facing the vessel, a circumferential groove for receiving a sealing ring, and electrical contacts connected to said current conductors and secured to said bottom portion, characterized in that said cap comprises a first substantially circular-cylindrical hollow body formed of synthetic material, and having a circumferential ridge; and a second body of synthetic material rigidly connected to said first body, and having a disc-shaped portion having an upright edge surrounding said first body at a first end thereof, and a projecting flange forming said mounting flange; said upright edge having an end surface, said end surface and said circumferential ridge forming opposed walls of said circumferential groove; said first and second bodies being rigidly connected to each other, and said metal sleeve and said first body including cooperating means for locking said sleeve to said first body against displacement.

2. A lamp as claimed in claim 1, characterized in that said first and second bodies are connected to each other in a vapor-tight manner.

3. A lamp as claimed in claim 1 or 2, characterized in that said means includes at least one longitudinal groove formed on an inner surface of said first body, open at said first end only of said first body, and a projection on said metal sleeve engaging said groove.

4. A lamp as claimed in claim 3, characterized in that said projection is held in said longitudinal groove with a clamping fit.

5. A lamp as claimed in claim 4, characterized in that at its second end the metal sleeve has flanged tongues which bear on said second body.

6. A lamp as claimed in claim 3, characterized in that at its second end the metal sleeve has flanged tongues which bear on said second body.

7. A lamp as claimed in claim 6, characterized in that said first and second bodies are interconnected by ultrasonic welding.

8. A lamp as claimed in claim 5, characterized in that said first and second bodies are interconnected by ultrasonic welding.

9. A lamp as claimed in claim 1, characterized in that said first and second bodies are interconnected by ultrasonic welding.

10. A lamp as claimed in claim 1, characterized in that at its second end the metal sleeve has flanged tongues which bear on said second body.

* * * * *